(12) United States Patent
Bruton et al.

(10) Patent No.: US 12,065,742 B2
(45) Date of Patent: Aug. 20, 2024

(54) COMPOSITE LAMINATES WITH METAL LAYERS AND METHODS THEREOF

(71) Applicant: The Boeing Company, Chicago, IL (US)

(72) Inventors: Eric Alan Bruton, St. Louis, MO (US); Christopher H. Childers, St. Charles, MO (US); Kenneth W. Young, Bear, DE (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/653,336

(22) Filed: Mar. 3, 2022

(65) Prior Publication Data

US 2023/0313384 A1 Oct. 5, 2023

(51) Int. Cl.
*C23C 24/04* (2006.01)

(52) U.S. Cl.
CPC .................................. *C23C 24/04* (2013.01)

(58) Field of Classification Search
CPC ...................................................... C23C 24/04
See application file for complete search history.

(56) References Cited

U.S. PATENT DOCUMENTS

| | | | |
|---|---|---|---|
| 4,390,489 A | 6/1983 | Segal | |
| 4,769,270 A | 9/1988 | Nagamatsu et al. | |
| 5,127,601 A | 7/1992 | Schroeder | |
| 5,246,538 A | 9/1993 | Johnson | |
| 5,302,414 A | 4/1994 | Alkhimov et al. | |
| 6,129,948 A | 10/2000 | Plummer et al. | |
| 7,354,354 B2 | 4/2008 | Palumbo et al. | |
| 8,119,531 B1 | 2/2012 | Arnold | |
| 2004/0058064 A1 | 3/2004 | Fuller et al. | |
| 2006/0093736 A1 | 5/2006 | Raybould et al. | |
| 2006/0135282 A1 | 6/2006 | Palumbo et al. | |
| 2007/0175573 A1 | 8/2007 | Fox et al. | |
| 2008/0145555 A1 | 6/2008 | Kocik et al. | |
| 2009/0029180 A1 | 1/2009 | Oguri et al. | |
| 2010/0040902 A1 | 2/2010 | Mizrahi | |
| 2010/0119707 A1 | 5/2010 | Raybould et al. | |
| 2010/0304063 A1 | 12/2010 | McCrea et al. | |
| 2011/0039024 A1 | 2/2011 | Jabado | |
| 2011/0135884 A1 | 6/2011 | Lettow | |
| 2011/0159764 A1 | 6/2011 | Price et al. | |
| 2012/0037449 A1* | 2/2012 | Ayle | E04B 1/86 29/896.2 |
| 2012/0125660 A1 | 5/2012 | Bright | |
| 2013/0001211 A1 | 1/2013 | Lewis | |
| 2013/0095340 A1 | 4/2013 | Sivakumar et al. | |
| 2014/0141257 A1 | 5/2014 | Ranade et al. | |
| 2017/0165906 A1* | 6/2017 | Alms | B32B 15/20 |
| 2018/0186460 A1 | 7/2018 | Dardona et al. | |
| 2018/0233981 A1 | 8/2018 | Yin et al. | |
| 2019/0233946 A1* | 8/2019 | Bruton | C23C 28/322 |
| 2020/0032010 A1* | 1/2020 | Liao | C08K 3/22 |
| 2020/0399763 A1 | 12/2020 | Bruton | |
| 2021/0031929 A1 | 2/2021 | Goodfellow | |
| 2021/0176904 A1 | 6/2021 | Su | |
| 2023/0047638 A1 | 2/2023 | Bruton et al. | |
| 2023/0050236 A1 | 2/2023 | Chen et al. | |
| 2023/0086889 A1 | 3/2023 | Bruton et al. | |
| 2023/0212756 A1 | 7/2023 | Bruton et al. | |

FOREIGN PATENT DOCUMENTS

| | | |
|---|---|---|
| EP | 3401419 A1 | 11/2018 |
| WO | 2019148162 A1 | 8/2019 |

OTHER PUBLICATIONS

Notification Concerning Transmittal of International Preliminary Report on Patentability mailed Aug. 13, 2020 in correspondeing PCT Application No. PCT/US2019/015558, 10 pages.
Wikipedia "Thermal Spraying," author unknown, retrieved from https://en.wikipedia.org/w/index.php?title=Thermal_spraying&oldid=393967885, last edited on Apr. 24, 2019, 8 pages.
Bruton et al., "Cold Spray Metallic Coating and Methods," U.S. Appl. No. 16/215,386, filed Dec. 10, 2018.
Che et al., "Metallization of carbon fibre reinforced polymers by cold spray," Surface & Coatings Technology 313 (2017) 236-247.
Tsipouridis, (Authorized Officer), International Search Report and Written Opinion mailed Apr. 11, 2019 issued in related International Application No. PCT/US2019/015558 filed Jan. 29, 2019.
Zhou et al., "Preparation of metallic coatings on polymer matrix composites by cold spray," Surface & Coatings Technology 206 (2011) 132-136 (Year: 2011).
Extended European Search Report issued Jan. 26, 2021 in corresponding European Application No. 20180711.2, 12 pages.
Ganesan et al., "Cold Spray Coating Deposition Mechanism on the Thermoplastic and Thermosetting Polymer Substrates," Journal of Thermal Spray Technology, Apr. 19, 2013 (revised Jul. 7, 2013), vol. 22(8), ASM International 8 pages.
Author Unknown, Thermcraft, Inc., "Electrical Resistance Heating Elements: An Overview," 2016, 30 pages.
Extended European Search Report for European Application No. 23159642.0 dated Jul. 6, 2023, 7 pages.
Bruton et al., "Cold Sprayed Electrical Circuits and Methods Thereof," U.S. Appl. No. 17/653,333, filed Mar. 3, 2022, 35 pages.
Extended European Search Report for European Application No. 23159607.3 dated Jun. 19, 2023, 6 pages.

(Continued)

*Primary Examiner* — Callie E Shosho
*Assistant Examiner* — Bethany M Miller
(74) *Attorney, Agent, or Firm* — MH2 Technology Law Group LLP

(57) ABSTRACT

A multilayered article is disclosed, the multilayered article including a thermosetting polymer material having at least one surface, a thermoplastic polymer layer deposited on the at least one surface of the thermosetting polymer material, a cold sprayed metal layer present on at least a portion of a surface of the thermoplastic polymer layer, at least one additional layer, the at least one additional layer sandwiching at least a portion of the cold sprayed metal layer between the additional layer and the thermoplastic polymer layer, where the thermoplastic polymer layer has a crystallinity of about 5% to about 60%. A method of providing a composite laminate structure is also disclosed.

22 Claims, 4 Drawing Sheets

(56) References Cited

OTHER PUBLICATIONS

Dielectric Manufacturing, "Kapton (R) (Unfilled Polyimide)," Product Sheet, Apr. 1, 2023, 3 pages.
Extended European Search Report for European Application No. 23193578.4 dated Dec. 13, 2023, 5 pages.

* cited by examiner

COMPOSITE LAMINATES WITH METAL LAYERS AND METHODS THEREOF

TECHNICAL FIELD

The present disclosure relates to a process for providing a metal layer for composite laminate structures, as well as multilayered composite structures having cold sprayed metallic layers integrated therein.

BACKGROUND

Aerospace vehicles such as commercial aircraft and their integrated components undergo various fluctuations in mechanical, temperature, and other environmental conditions during manufacture, operation, and service. To address such fluctuations and undesirable impacts to the components, metallization of multilayered composites has been employed in the fabrication of components in such aerospace vehicles in various approaches but can be challenging. Metallization of composite materials may further provide advantageous properties such as electromagnetic interference (EMI) or direct lightning strike protection to the surface of a composite material. Many of the composites used in aerospace and automotive applications are based on thermoset materials. In particular, thermoset epoxies tend to more easily erode when using certain metallization techniques.

While techniques exist to deposit conductive materials directly onto thermoset composites, thermoset composites tend to erode more easily when cold sprayed due to their inherent physical properties. Cold spray processing may lead to erosion and surface degradation under certain conditions. Other materials or layers may be available that can accept the cold spray layer metal layer without the same issues noted in cold spraying of thermoset materials. Thus, it is desirable to provide a simpler, more robust material and process for the fabrication of multilayered composite materials. There is further a need for the improvement in the fabrication methods and design of multilayered composite panels within aircraft and other vehicle components.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A multilayered article is disclosed. The multilayered article includes a thermosetting polymer material having at least one surface, a thermoplastic polymer layer deposited on the at least one surface of the thermosetting polymer material, a cold sprayed metal layer present on at least a portion of a surface of the thermoplastic polymer layer, at least one additional layer, the at least one additional layer sandwiching at least a portion of the cold sprayed metal layer between the additional layer and the thermoplastic polymer layer, and where the thermoplastic polymer layer has a crystallinity of about 5% to about 60%.

Implementations of the multilayered article may include where the thermosetting polymer material includes an epoxy resin. The thermosetting polymer material may include multiple layers. The thermosetting polymer material further may include one or more fillers or reinforcement materials such as carbon, carbon nanotubes, graphite, carbon fibers, graphite fibers, fiberglass, glass fibers, metals, metal alloys, metalized fibers and metal coated glass fibers. The thermoplastic polymer layer may include a carbon fiber or glass fiber reinforced poly-ether-ether-ketone (PEEK) or poly-ether-ketone-ketone (PEKK). The cold sprayed metal layer is selected from silver, gold, aluminum, cobalt, chromium, copper, iron, nickel, molybdenum, palladium, platinum, rhodium, ruthenium, tin, titanium, tungsten, zinc, zirconium, or alloys thereof. The thermosetting polymer material may be cured after deposition of the thermoplastic polymer layer. The multilayered article is a component or part of an aerospace vehicle. The component or part of an aerospace vehicle is an external surface thereof. The second thermoplastic polymer layer may have a crystallinity of about 5% to about 60%. The second thermoplastic polymer layer may include a carbon fiber or glass fiber reinforced poly-ether-ether-ketone (PEEK) or poly-ether-ketone-ketone (PEKK). The second cold sprayed metal layer may be selected from silver, gold, aluminum, cobalt, chromium, copper, iron, nickel, molybdenum, palladium, platinum, rhodium, ruthenium, tin, titanium, tungsten, zinc, zirconium, or alloys thereof.

Another multilayered article is disclosed. The multilayered article may include a thermosetting polymer material having a first surface and a second surface, a first thermoplastic polymer layer deposited on the first surface of the thermosetting polymer material, a second thermoplastic polymer layer deposited on the second surface of the thermosetting polymer material, a first cold sprayed metal layer present on at least a portion of a surface of the first thermoplastic polymer layer, a second cold sprayed metal layer present on at least a portion of a surface of the second thermoplastic polymer layer, and where the first thermoplastic polymer layer and the second thermoplastic polymer layer each have a crystallinity of about 5% to about 60%.

A method of providing a composite laminate structure is disclosed. The method of providing a composite laminate structure includes providing a multilaminate thermosetting polymer structure prior to the thermosetting polymer structure being in a fully cured state. The method of providing a composite laminate structure also includes depositing a thermoplastic polymer layer onto a first surface of the multilaminate thermosetting polymer structure. The method of providing a composite laminate structure also includes introducing particles of a metal powder to a gas stream, directing the gas stream toward the thermoplastic polymer layer, where the gas stream has a temperature and pressure adjusted to prevent thermal softening or ablation of the surface of the thermoplastic polymer layer, forming a metallic coating on at least a portion of the thermoplastic polymer layer. The method of providing a composite laminate structure also includes curing the multilaminate thermosetting polymer structure.

Implementations of the method of providing a composite laminate structure may include where the thermoplastic polymer layer may include poly-ether-ether-ketone (PEEK), poly-ether-ketone-ketone (PEKK), or a combination thereof. The thermoplastic polymer layer has a crystallinity of about 15% to about 40%. The metal coating may be selected from silver, gold, aluminum, cobalt, chromium, copper, iron, nickel, molybdenum, palladium, platinum, rhodium, ruthenium, tin, titanium, tungsten, zinc, zirconium, or alloys thereof. The temperature of the gas stream may be between 100° C. and 500° ° C. and the pressure of the gas stream may be between 100 psi and 400 psi. Curing the multilaminate thermosetting polymer structure may include subjecting the composite laminate structure to an elevated temperature under pressure. The method of providing a composite laminate structure may include depositing a second thermoplastic polymer layer onto a second surface of the multilaminate thermosetting polymer structure, directing the gas stream toward the second thermoplastic polymer layer, and forming a metallic coating on at least a portion of the second thermoplastic polymer layer.

BRIEF DESCRIPTION OF DRAWINGS

The accompanying drawings, which are incorporated in and constitute a part of this specification, illustrate embodiments of the present teachings and together with the description, serve to explain the principles of the disclosure. In the figures.

Figure 1:
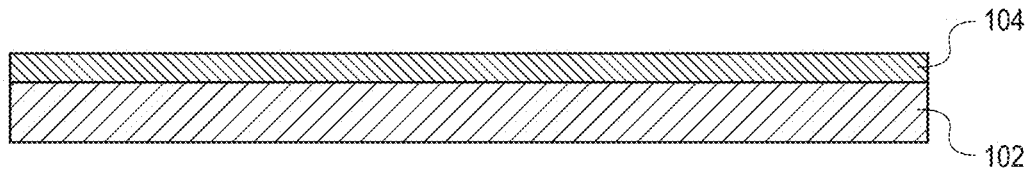
FIG. 1 depicts a cross-sectional view of a multilayered article, in accordance with the present disclosure.

It should be noted that some details of the figures have been simplified and are drawn to facilitate understanding of the present teachings rather than to maintain strict structural accuracy, detail, and scale.

DETAILED DESCRIPTION

Within components and other structures of certain aerospace vehicles such as commercial aircraft, various fluctuations in mechanical, temperature, and other environmental conditions occur during manufacture and service. To address such fluctuations and other undesirable impacts to the components, metallization of multilayered composites has been employed in the fabrication of components in such aerospace vehicles in various approaches but can be challenging. Many of the composites used in aerospace and automotive applications are based on thermoset materials or substrates.

In order to address the above issues, a process for providing metallized layers into structural or non-structural components or onto a surface of a polymer layer according to the present disclosure comprises a step of projecting metal particles, using a cold spraying method, onto at least a portion of the surface of a thermoplastic polymer, thereby forming a metallic coating. A metallic coating formed in such a manner and optionally included in a multilayer composite structure would improve the application of cold spray metal coating processes and avoid the erosion and surface degradation under certain conditions and material combinations. Metallization of composite materials according to the presently disclosed process and articles may further provide advantageous properties such as EMI resistance or lightning protection to such composite materials. Methods of the present disclosure further provide a simpler, more robust material and process for the fabrication of multilayered composite materials for use within aerospace vehicles, aircraft, and other components.

In this process, metal particles are projected onto the surface of a polymer composite layer of a multilayered composite article including a thermoset resin composite and a thermoplastic layer to form a metallic coating with excellent adhesion, in some examples, in a specific pattern, thereby imparting a metal layer onto a surface of the polymer. The metallic coating layer can alternatively be continuous on the surface of the thermoplastic polymer. The metallic coating can be semi-continuous on the surface of the thermoplastic polymer and may or may not contact a separate semi-continuous segment or portion in one or more lateral directions. The metallic coating can be patterned on the surface of the composite layer polymer having a layer of a thermoplastic polymer using conventional masking techniques or alternatively automated robotic methods. This multilayer composite with a metallic coating is produced using a technique in which metal particles are projected directly onto the surface of a thermoplastic polymer layer, and a metallic coating that exhibits excellent adhesion, improved electrical conductivity, or enhanced strength within the composite is provided.

Furthermore, a polymeric material fabricated as a thermoset composite laminate having a thermoplastic layer, for example, a barrier or an erosion protection layer, and a metallized layer deposited on the thermoplastic layer can provide a more robust component for aerospace and other vehicles. Consolidating a thermoset composite with one or more thermoplastic layers is possible with certain thermosets, as thermoplastic polymers such as polyetheretherketone (PEEK) and polyetherketoneketone (PEKK) are high temperature melting polymers, which can survive the consolidation conditions of the thermoset composites without detriment to the thermoset or thermoplastic layers. The proposed cold spray processes or methods and articles obtained therefrom can address many of the performance or processing issues described previously.

As used herein, "alloy" means a substance composed of two or more metals or a metal and a nonmetal intimately united usually by being fused together and dissolved in each other when molten.

As used herein, "cold sprayed metal" coating refers to a coating of metal layer formed via a deposition method where solid metal particles are accelerated in a gas stream to velocities capable of providing plastic deformation of the metal particles during impact with the substrate and providing and adherence of the metal particles to the substrate surface, for example, up to and including 1200 m/s. Cold spray metal coating avoids melting of the metal particles during the spraying process and can be performed well below a melting temperature for the solid metal particles and thus reduces thermal damage to the substrate being coated.

As used herein, "thermal sprayed metal" coating refers to a metal layer formed via a coating process in which melted (or heated near the melting point) metal are sprayed onto a substrate surface. The metal feedstock is typically particles heated by electrical (e.g., plasma or arc) or chemical (e.g., combustion flame) processes.

As used herein, "multilayered composite" refers to a composite material including more than one layer of differing materials, which can include, but is not limited to, a polymeric or metal substrate layer having one or more laminations of additional layers incorporated thereon, and the like. A polymeric substrate layer can also include a fiber-reinforced multilaminate composite structure.

As used herein, the phrase "electrochemical insulating layer" means a substance that prevents or eliminates electrochemical interactions between materials separated therefrom. Electrochemical interactions include oxidation-reduction reactions between materials and chemical reactions caused by an externally supplied current. Exemplary electrochemical interactions include, but are not limited to, galvanic and/or oxidation-reduction interactions of metal of the metallic layer present on fiber reinforced plastics with one or more components of fiber reinforced plastics. In one aspect, the electrochemical insulating layer prevents or eliminates electrochemical interactions between a cold or thermal sprayed metal and one or more components of the FRP composite. In one aspect, the electrochemical insulating layer prevents or eliminates electrochemical interactions between a cold or thermal sprayed metal and carbon fibers of the FRP composite.

As used herein, the term "surface" means a surface located on a particular side of an article. A side of an article may include various surfaces or surface areas, including, but not limited to, a polymer article surface area or joint surface area, etc. Thus, when reciting a coating or layer is applied to a "surface" of a polymer or an article made therefrom, it is intended that such surface can comprise any one or all of the surfaces or surface areas located on that particular side of the polymer being coated.

As used herein, the term "thermoplastic" polymer refers to a polymer capable of pliability or melt flow at a certain elevated temperature which solidifies upon cooling to a lower temperature. Generally, in a temperature range above the glass transition temperature of a thermoplastic polymer and below a melting temperature of a thermoplastic polymer, the physical properties of a thermoplastic polymer may change significantly without a corresponding phase change. In a temperature range below the glass transition temperature of a thermoplastic polymer, certain thermoplastic polymers retain some of their amorphous nature and do not crystallize completely.

As used herein, the term "thermosetting" polymer refers to a polymer that thermally sets with the formation of irreversible chemical bonds, or crosslinks, when subjected to elevated temperatures. Once formed, in contrast to thermoplastic polymers, thermosetting polymers cannot be changed in shape when subjected to elevated temperatures once crosslinked.

Polymer Material or Substrate

Examples of polymer materials that can be used (e.g., as a substrate) that undergoes surface coating with a metallic coating or circuit layer in accordance with the present disclosure include polymer materials that act as a matrix in combination with one or more types of fibers or other reinforcing or functional additives. In one example, materials useful for the practice of the present disclosure include fiber-reinforced plastics (FRP) comprising a polymer material in combination with an inorganic fiber such as fibers of carbon, carbon nanotubes, graphite, fiberglass, glass, metals, metal alloys, or metalized fibers and metal coated glass fibers, alumina fiber or boron fiber. In one example, the fiber reinforced plastic can comprise organic fiber such as a nylon fiber, or aramid fiber. In one example, the fiber reinforced plastic can comprise organic fiber and/or inorganic fiber blended into a thermosetting polymer, such as an epoxy resin material. In one example, a portion of a multilayered composite laminate may be constructed of multiple layers of thermoset layers, fiber layers, or a mixture thereof.

In one example, a carbon fiber reinforced plastic (CFRP) or glass fiber reinforced plastic (GFRP) as the polymer article made therefrom is imparted with integrated electrical conductivity via cold sprayed coated circuitry via one or more coated traces suitable for aircraft structures or the like. However, the present disclosure is not restricted to these types of materials or any particular arrangement, and articles formed from other polymers can also be used in the presently disclosed process of the present disclosure.

In one example, the polymer substrate comprises a crystalline polymer. Crystalline polymers provide high temperature resistance as well as chemical resistance to FRPs. For example, epoxy-based polymers are crystalline and can be thermally stable up to temperatures as high as 260° C. and possibly higher depending on the specific formulation and additives used. In another example of the polymer substrate comprises a semi-crystalline polymer. Semi-crystalline polymers provide the benefits of crystalline polymers along with ductility and processing advantages to FRPs. In yet another example, the polymer substrate comprises an amorphous polymer. Amorphous polymers provide for resiliency, ductility and processing advantages to FRPs.

In one example the polymer substrate is selected from epoxies, phenolics, polyesters, polyesters, ureas, melamines, polyamides, polyimides, poly-ether-ether-ketones (PEEK), poly-ether-ketone-ketone (PEKK), polyetherimide (PEI), polyphthalamide, polyphtalates, polysulfone, polyurethanes, chlorinated polymers, fluorinated polymers, polytetrafluoroethylene, polycarbonates, liquid crystal polymers, partially crystalline aromatic polyesters, and modified versions thereof containing one or more fillers or reinforcement materials selected from carbon, carbon nanotubes, graphite, carbon fibers, graphite fibers, fiberglass, glass fibers, metals, metal alloys, metalized fibers and metal coated glass fibers.

Thermoplastic Polymer Layer

In one example, a thermoplastic polymer layer is provided between the polymer substrate surface and the cold spray deposited metallic coating or layer. Exemplary thermoplastic polymer layer materials may include non-conductive polymer, such as thermoplastic polymer composites including fiberglass, other polymers, or ceramics as fillers. Exemplary thermoplastic polymer layer materials include, but are not limited to non-conductive polymers such as PEEK or PEKK with or without fillers, nonconductive fiber-impregnated thermoplastic polymers, or other thermoplastic coatings containing nonconductive fiber-reinforcing materials. A thermoplastic layer including, but not limited to PEEK and PEKK can accept a cold sprayed metal to metallize the surface. Due to the deformation properties of such thermoplastic materials, these layers provide a layer that, when combined with the lower temperature and pressure conditions of the cold spray process as described herein, can be more resistant to abrasive or erosive conditions found in higher temperature and pressures as compared to polymers having higher crystallinity. In one example the thermoplastic polymer layer is impregnated with fiberglass ($Si_xO_y$). In another example the thermoplastic polymer layer includes a metal-metal oxide composite material such as aluminum-aluminum oxide (Al—$Al_2O_3$), or is titanium oxide ($TiO_2$), silicon oxy carbide ($SiO_xC_y$) and the like. In another example, the thermoplastic polymer layer includes a cemented carbide alloy, such as tungsten carbide cobalt nickel alloy (WC—Co—Ni). In one aspect, the thermoplastic polymer layer can be applied to the polymer surface using, for example, chemical vapor deposition, atmospheric plasma deposition, melt deposition, or by way of curable glass fiber or other nonconductive fiber-reinforced thermoplastics, paints, or coatings. In one aspect, the electrochemical insulating layer may be built into one or more external surfaces of a layup of the polymer composite substrate structure. The thermoplastic layer may also be referred to as a barrier layer or an erosion protection layer, with a metallized layer deposited on the thermoplastic layer. Depositing a cold sprayed metal layer onto the thermoplastic layer in some examples, as compared to a deposition onto a thermoplastic layer directly, can avoid erosion associated with other metallization techniques. Consolidating a thermoset composite with a thermoplastic layer is possible as thermoplastic materials such as PEEK and PEKK are higher temperature melting polymers, melting in a range from about 300° ° C. to about 360° C., which can survive the consolidation conditions of the thermoset composites, which in some examples can be as high as from about 250° C. to about 350° C., without detriment to the thermoset or thermoplastic layers during a complete, full cure or crosslink of the thermosetting components within a multilayered composite structure. Exemplary thermoplastic polymer layers may include, but are not limited to semi-crystalline thermoplastic polymers such as PEEK, PEKK, polyphenylene sulfide (PPS), Polyphthalamide (PPA), or combinations thereof. Other exemplary thermoplastic polymers may include amorphous polymers such as, but not limited to polyimide, polyamide imide, polybenzimidazole (PBI), or combinations thereof. It should be noted that certain thermoplastic polymers may be modified with one or more additives, such as plasticizers or fillers to increase or decrease the crystallinity of the thermoplastic polymer. In some examples, the multilayered composite article may include one or more layers of similar or different thermoplastic polymer layers disposed upon one or more surfaces on the substrate. It is generally desirable for the thermoplastic polymer layer to be uniform, to better control the cold spray metal layer thickness. Uniformity can be a factor if the thermoplastic layer is too thin. For the thermoset thickness layers the PEEK or PEKK, for example, should not be melted, and consistency of thickness in each layer is generally important. Without wishing to be bound to any particular theory, it is understood that the uniformity of layers within a multilayer composite may follow a layer below, thus it is desirable to have the uniformity of each layer be consistent in order to provide consistent properties within a thermoplastic layer, as well as a metal layer or additional layer in contact with the thermoplastic layer. While the thickness of the thermoplastic layer may influence the adhesion and other aspects of the cold spray process, a particular crystallinity of the thermoplastic polymer may also impact the quality and properties of the cold spray metal layer. Without being bound by any particular theory, a level of approximately 20% crystallinity within the thermoplastic polymer layer is desirable in practicing the method of the present disclosure. In certain aspects, the crystallinity of the thermoplastic polymer is from about 5% to about 60%, or from about 15% to about 45%, or from about 15% to about 30%, or from about 20% to about 30%. If the crystallinity of the thermoplastic polymer is in a higher range, the surface may be brittle and will not be as amenable to adhesion and formation of the cold sprayed metal layer and may erode when subjected to the cold spray metal process. If the crystallinity of the thermoplastic polymer is in a lower range the thermoplastic polymer layer may exhibit reduced solvent resistance or other properties important for extreme environmental conditions to which aerospace vehicles or components are exposed. In some examples, the miscibility of thermoplastic polymers with thermosetting polymer compositions will not result in significant mixing of the respective layers during processing but will be sufficient to contribute to adhesion between the two types of polymer layers. Porosity in thermoplastic films may also result in poor adhesion of the cold spray material or result in thickness variations. Thus, sufficient pressure, temperature, and other processing conditions and procedures as described herein may used to avoid such deficiencies.

Cold Spray Metal Layer

In one example, the present disclosure further comprises introducing a cold sprayed metal layer onto the thermoplastic polymer layer, which may include at least one additional layer sandwiching at least a portion of the cold sprayed metal layer between the at least one additional layer and the thermoplastic polymer layer present on the polymer substrate surface. In one example, the cold sprayed metal layer is cold or thermal sprayed on at least a portion of the thermoplastic polymer layer present on the thermoset polymer substrate surface. In one aspect, the cold sprayed metal layer can be applied using, for example, chemical vapor deposition, atmospheric plasma deposition, and metal melt deposition.

The cold sprayed metal layer can be selected from Ag, Au, Co, Cr, Cu, Fe, Ni, Mo, Pd, Pt, Rh, Ru, Sn, Ti, W, Zn, Zr, and alloys thereof. In one example, the cold sprayed metal layer comprises cold sprayed copper to provide a ductile or conductive metal layer. In one example, multiple layers of cold sprayed metal may comprise the cold sprayed metal layer. In one example, the cold sprayed metal layer comprises cold or thermal sprayed copper on a carbon fiber or glass fiber reinforced poly-ether-ether-ketone (PEEK) or poly-ether-ketone-ketone (PEKK).

At least one additional layer may be provided, the at least one additional layer sandwiching or enveloping at least a portion of the cold sprayed metal between the additional layer and the thermoplastic polymer layer to encapsulate or enclose at least a portion of a cold sprayed metal coating present within the multilayered composite article or entire composite structure. In one example, the additional layer is of a different metallic composition than that of the cold sprayed metallic coating present on the thermoplastic polymer layer surface. In one example, the additional layer is cold or thermal sprayed on at least a portion of the first cold sprayed metallic coating present on the thermoplastic polymer layer surface or any layer applied previously. In another example, the additional layer is cold or thermal sprayed on an area larger than an area of the first cold sprayed metallic coating present on the thermoplastic polymer layer surface or any layer applied previously. In another example, the additional layer is cold or thermal sprayed on an area smaller than an area of the first cold sprayed metallic coating present on the thermoplastic polymer layer surface or any layer applied previously. In one aspect, the additional layer may be applied using, for example, chemical vapor deposition, atmospheric plasma deposition, and metal melt deposition. In alternate examples, the additional layer may be composed of one or more materials similar or identical to either the materials described for use as the polymeric composite substrate layer or layers, such as a composite based on a thermosetting resin, the thermoplastic polymer layer, or a combination thereof.

The thermoplastic polymer layer can be subjected to a pretreatment prior to formation of the metallic coating, for example, by roughening the surface of the thermoplastic polymer to provide an irregular surface topography. An irregular surface topography can result from various surface pretreatment methods, such as mechanical abrasion and etching. Such surface irregularities can contribute to a surface texture that influences bond strength between the metallic layer and the thermoplastic polymer surface. Suitable examples of roughening the surface of the thermoplastic polymer include fine particle shot blasting where such fine particles can be such as metals, ceramics and glass. The particles used in the shot blasting can be substantially spherical or contain edges. Other surface roughening methods may be used as known in the art.

In one example, following completion of this optional surface roughness pretreatment, which may be used as required to roughen the surface of the thermoplastic polymer, metallic particles are projected onto the surface of the thermoplastic polymer using a cold spraying method, so as to form a metallic coating thereon. In another example, the cold sprayed metal layer conforms to the original surface roughness of the thermoplastic polymer surface, making the resultant metal coated thermoplastic polymer surface amenable to painting and other fabrication.

The cold spraying method is a technique in which metallic particles are heated to a temperature that is lower than the melting point or softening point of the metallic particles, and are then sprayed using a propellant gas, thereby causing the metallic particles to impinge into the substrate in a solid state, forming a coating or layer. Provided the collision velocity of the cold sprayed particles is greater than a certain fixed velocity, which is specific to the metal or other particle being cold sprayed (the critical velocity), the kinetic energy of the particles causes the particles to undergo a plastic deformation, enabling formation of the coating to start. This critical velocity varies depending on the metal or alloy used for the particles and the glass transition temperature of the substrate, as well as the particle size. In the present disclosure, the spray pressure of the above propellant gas is selected so that the collision velocity of the metal particles striking the polymer reaches a critical velocity associated with the metal used and the polymer substrate or other layer and is typically set to a value of between about 100 about 400 psi.

The heating temperature of the propellant gas comprising the metal particles is usually selected appropriately in accordance with the materials being used, and is typically set to a value of about 100° C. and not more than 500° C. In one example, the gas flow uses a gas having a pressure of from between about 100 psi and about 400 psi, so as to provide a temperature below the melting point of the metallic particles. In one example the temperature is between about 100° C. to about 500° C. These conditions provide for efficient acceleration of the metallic particles and reduces thermal and chemical effects associated with higher temperatures typically used in thermal spray processes. In one example, the gas flow uses a gas having a pressure of from between about 100 psi and about 600 psi.

In one example, readily available air or nitrogen can be used as the gas for forming a gas stream to reduce oxidative effects and reduce cost. The air or nitrogen makes it possible to regulate the velocity of metallic particles within a range of subsonic to supersonic velocity, e.g. from 300 to 1200 m/s. Controlling the velocity of particles can be achieved by heating the gas and also provides for regulation of the velocity of particles within wide limits.

An apparatus for carrying out the method for applying a coating can comprise a metering powder feeder having a casing incorporating a hopper for containing the metallic particles. In one example the hopper is formed as a drum having depressions in its cylindrical surface for metering the metallic particles and presenting the powder to a mixing chamber provided with a nozzle configured for accelerating the metallic particles. A source of compressed gas is connected to the mixing chamber. A metallic particle flow controller is operably connected to the cylindrical surface of the drum, providing a space that results in a desired flowrate of the particles. An intermediate nozzle can be connected to the mixing chamber that communicates, via an inlet pipe, with the source of compressed gas. In one example a CenterLine (Windsor) Limited system (Ontario, Canada), with robotics, is used as the cold spray apparatus.

The presently disclosed method provides for applying a conductive, metallic coating or layer to the surface of a thermoplastic polymer, such as those described herein. In one example, the particles are of a size of from 1 to 50 microns in an amount so as to provide a density of mass flow rate of the particles suitable for providing a continuous, non-continuous, or patterned metallic coating on the substrate surface that is dense, and of a low volume of microvoids to optimize conductivity and strength of the coating. The resultant metallic coating or layer is uniform, without phase transformations, and generally conformal to the surface roughness of the substrate. A dense coating, free of microvoids, may refer to a coating having particle to particle contact internally and between particles, such that the continuity of particles provides physical and electrical integrity. Microvoids, or porosity within a coating layer could lead to cracking and other issues related to physical integrity of a coating, breaks in electrical continuity, or a combination thereof. Therefore, the resultant metallic coatings or layers do not crack, have metal like microhardness, and display excellent cohesive and adhesive strength. A particle size of less than 1 micron is undesirable, as a stable spray state may not be achievable. If the particle size exceeds 50 microns, then uniform deposition of the particles becomes problematic. Average particle size may be determined in a commercially classified product, or by laser light scattering, according to several methods, for example, ASTM B822-20, Standard Test Method for Particle Size Distribution of Metal Powders and Related Compounds by Light Scattering.

The presently disclosed method further provides for heating the multilayered composite uniformly during a final curing step, as well as adhering to standard conventions of avoiding overheating thermoset composites during curing procedures. Temperature control is important to avoid unnecessary or detrimental high-temperature exposure of the thermoplastic layer, such that the thermoplastic layer becomes too thin, particularly in such a manner that results in variability of thickness in the thermoplastic layer. This may result in a final cure temperature heating some areas too much, where a layer may be thinner, or heating an area not enough if a layer is thicker, due to pooling. Furthermore, heating rates in some examples may be material dependent. Temperature uniformity during the cooling is important, in order to avoid irregular shrinking between layers of differing materials due to a coefficient of thermal expansion (CTE) mismatch between the composite and the thermoplastic polymer layer. In certain instances, such as when the thermoplastic layer includes a semi-crystalline film such as PEEK, temperature control during cooling may help avoid crystallization induced shrinkage. A CTE mismatch may cause the thermoplastic layer to separate from the composite if it is cooled too quickly. Specific cooling rates are material combination dependent but should be from 1-50° C./min, or at a rate of 5° C./minute or less. In certain aspects, a combination of a uniform final curing step with an uncured material that is first cold sprayed with a metal layer can provide advantageous interlayer bonding as compared to methods not employing this particular aspect.

Using the process described above, a metallic coating is formed on at least a portion of the surface of the thermoplastic polymer, thereby providing electrical conductivity or barrier layer properties, which can impart EMI shielding, improved corrosion resistance, ultraviolet radiation protection, erosion resistance, combinations thereof, or other known benefits of incorporation of a metal later into a multilayered material, and/or into a structural component of or a portion of a vehicle.

In a polymer composite structure with a metallic coating layer obtained in this manner, the thickness of the metallic coating can be from 1 mils (25.4 microns) to 14 mils (356 microns). Where the multilayered polymer composite structure with EMI shielding, electrical conductivity, improved corrosion resistance, or circuitry within the multilayered polymer composite material is used as an aircraft main wing structure, the thickness of the metallic coating is not less than 3 mils (76 microns) and not more than 10 mils (254 microns), e.g., so as to not contribute to the weight of the structure. In certain examples, metallic coatings of as low as 1 mil (25 microns) may be preferable.

The metallic coating can be formed from a single layer, or can be formed by depositing two or more layers together. In the case of a two-layer coating, aluminum, or nickel, either of which exhibits excellent adhesion to a variety of electrical insulating layers, can be used for forming the layer closest to the substrate of the polymer. In one example, forming a layer of aluminum closest to the substrate surface of the polymer is performed. In one example, so as to provide an acceptable level of electrical conductivity or electrical connectivity, a layer of aluminum is sprayed closest to the substrate of the polymer followed by a sprayed layer of copper or other metal. An application of multiple layers via cold spray can provide an application of dissimilar metals or cold spray materials. For example, layering one or more metals, in part, can modify a surface to accept a successive coating layer. For example, in one aspect, cold spraying titanium onto a particular substrate, such as a thermosetting resin material may be difficult without damaging the substrate surface. A first layer application of aluminum allows the addition of titanium onto aluminum as an alternative to direct application. This can provide a metal layer with a desired material property, including, but not limited to, ductility.

FIG. 1 depicts a cross-sectional view of a multilayered article, in accordance with the present disclosure. A portion of a multilayered article 100 includes a substrate of a thermosetting polymer layer 102, having at least one surface. The thermosetting polymer layer 102 can be an epoxy, phenolic, polyester, polyester, urea, melamine, polyamide, polyimides, poly-ether-ether-ketones (PEEK), poly-ether-ketone-ketone (PEKK), polyphthalamide, polyphtalates, polysulfone, polyurethanes, chlorinated polymers, fluorinated polymers, polytetrafluoroethylene, polycarbonates, liquid crystal polymers, partially crystalline aromatic polyesters, and modified versions thereof. The polymer substrate can be one of the polymers listed above containing one or more fillers or reinforcement materials comprising carbon, carbon nanotubes, graphite, carbon fibers, graphite fibers, fiberglass, glass fibers, metals, metal alloys, metalized fibers and metal coated glass fibers. In some aspects, the thermosetting polymer layer 102 includes multiple layers of either similar or differing materials layered in various orientations. A thermoplastic polymer layer 104 is deposited onto at least a portion of a surface of the thermosetting polymer layer 102. The thermoplastic polymer layer 104 material includes non-conductive materials, such as fiberglass, polymers, and ceramics, optionally within a non-conductive, semi-crystalline polymer matrix. Exemplary thermoplastic polymer layer materials include, but are not limited to non-conductive polymers (e.g., PEEK or PEKK) with or without fillers; nonconductive fiber-impregnated fabrics, polymers, thermoplastic polymers, and thermosets; or other thermoplastic polymer coatings containing nonconductive fiber-reinforcing materials, such as fiberglass ($Si_xO_y$). The thermoplastic polymer layer has a crystallinity of about 15% to about 40%.

Figure 2:
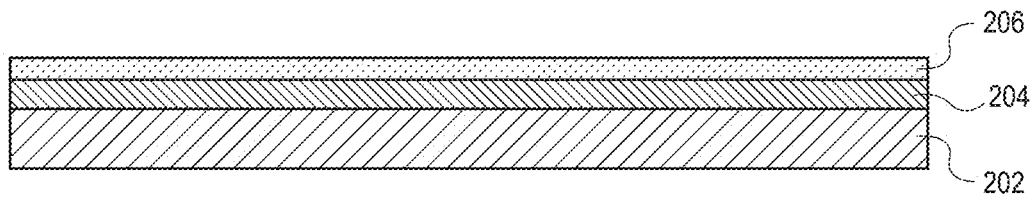
FIG. 2 depicts a cross-sectional view of a multilayered article having a first metallic coating, in accordance with the present disclosure.

FIG. 2 depicts a cross-sectional view of a multilayered article having a first metallic coating, in accordance with the present disclosure. A portion of a multilayered article 200 having a substrate of one or more thermosetting polymer layers 202 and a thermoplastic polymer layer 204 is shown, the surface of which is partially covered by cold sprayed metal layer 206 is depicted and may be considered to be a cross-section of an example similar to that as depicted in FIG. 1. Semi-crystalline thermoplastic polymers such as PEKK or PEEK may more readily accept cold sprayed metal layers 26 as compared to applying the cold sprayed metal layer 206 onto thermosetting polymer layers 202 or composites. Without being bound by any particular theory, thermoset epoxies may tend to more easily erode than when cold sprayed as compared to thermoplastics. Combining a thermosetting polymer layer 202 with a thermoplastic polymer layer 204 in such a manner, where the thermosetting polymer material is cured after deposition of the thermoplastic polymer layer may prove advantageous, as thermoplastic polymers such as PEEK and PEKK are high temperature melting polymers that may survive the consolidation and curing conditions of the thermoset composites without detriment to either the thermoset or thermoplastic layers, and provide a thermoplastic layer capable of deformation, when combined with the lower temperature and pressure conditions of the cold spray process as described herein. In certain examples, other polymers such as those listed herein in reference to the thermoplastic polymer layer may also be useful. A fully cured polymer or multilayered composite material may be defined as a material wherein no further appreciable crosslinking may take place upon further exposure to a curing or crosslinking energy, such as heat or other radiation, such as ultraviolet, electron beam or other curing radiation. In a fully cured polymer or composite material, a large number of individual molecules have formed a three-dimensional network, either by way of reaction within functional groups of polymers or other additives, or by way of addition of a specific initiator molecule or crosslinker. In certain aspects, the application of cold spray metal layers may be conducted directly onto a thermoset composite layer. The cold sprayed metal layer 206 may include silver, gold, aluminum, cobalt, chromium, copper, iron, nickel, molybdenum, palladium, platinum, rhodium, ruthenium, tin, titanium, tungsten, zinc, zirconium, alloys thereof, or combinations thereof.

Figure 3A:
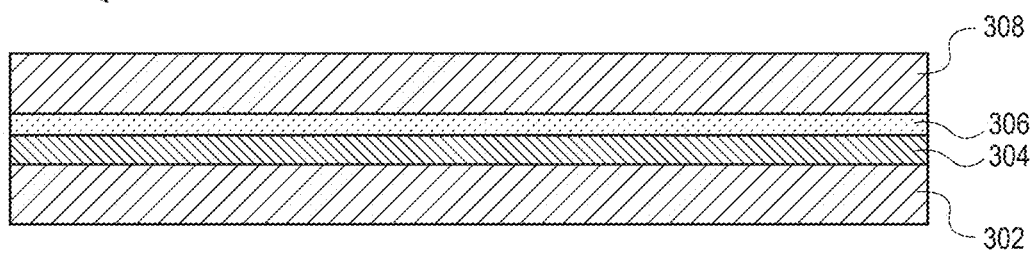
FIG. 3A depicts a cross-sectional view of a multilayered article having a first metallic coating and an additional layer, in accordance with the present disclosure.
Figure 3B:
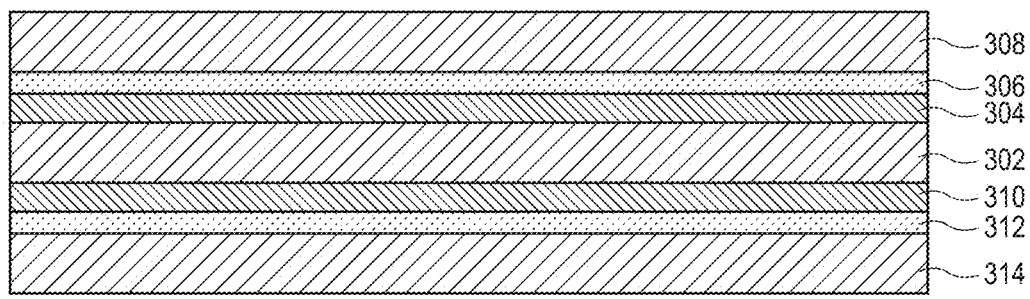
FIG. 3B depicts a cross-sectional view of a multilayered article having a first metallic coating on one surface, and a second metallic coating on a second surface, in accordance with the present disclosure.

FIG. 3A depicts a cross-sectional view of a multilayered article having a first metallic coating and an additional layer, in accordance with the present disclosure. A multilayered article 300 having a thermosetting polymer layer 302 substrate, a first thermoplastic polymer layer 304, and a first cold sprayed metal layer 306 further has a first additional layer 308 disposed onto the first cold sprayed metal layer 306. Thus, the first cold sprayed metal layer 306 may be entirely or partially encapsulated by the first additional layer 308. Encapsulation refers to either the first cold sprayed metal layer 306 or a second cold sprayed metal layer 312 being at least partially enclosed from an exterior of the multilayered article 300. In certain aspects, the first cold sprayed metal layer 306 or second cold sprayed metal layer 312 is completely encapsulated, enclosed, or covered by either the additional layer 308, another layer, or a combination thereof, meaning that no portion is exposed to an exterior part of an entire multilayered article 300. In some examples, the first additional layer 308 is composed of the same material as the thermosetting polymer layer 302 substrate. In some examples, the first additional layer 308 may include an additional thermoplastic polymer layer. Still other examples may include a first additional layer 308 made of a metal foil or another cold spray metal layer, or any of the other layers incorporated into multilayered composite articles as described herein. The first additional layer 308 may also be constructed or processed as described, with the final cure of the first additional layer 308 being suspended until the final cure or process involving the full multilayered composite article. FIG. 3B depicts a cross-sectional view of a multilayered article having a first metallic coating on one surface, and a second metallic coating on a second surface, in accordance with the present disclosure. In certain aspects, a multilayered article 300 as shown in FIG. 3A may be subsequently processed to provide a multilayered article 316 having a second thermoplastic polymer layer 310, a second cold sprayed metal layer 312, and a second additional layer 314 in addition to the first thermoplastic polymer layer 304, the first cold sprayed metal layer 306, and the first additional layer 308. This multilayered article 316 also has the thermosetting polymer layer 302 substrate as a base layer. The first additional layer or the second additional layer may sandwich or encapsulate at least a portion of the cold sprayed metal layer between a respective additional layer and the thermoplastic polymer layer onto which the cold sprayed metal layer is deposited. In some examples, one or more cold sprayed metal layers may be continuous, or alternatively non-continuous as applied. Such components constructed as described herein may serve as a component or part of an acrospace vehicle, or alternatively, as an external surface thereof.

Figure 4:
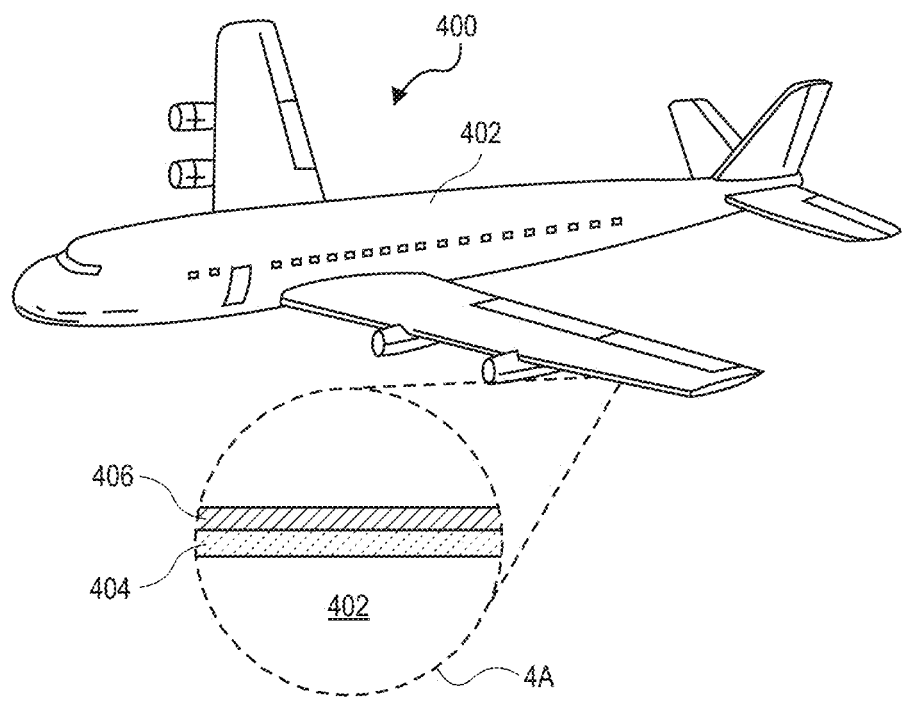
FIG. 4 depicts an application of a multilayered article including a cold sprayed metallic layer applied to an aerospace vehicle.

FIG. 4 depicts an application of a multilayered article including a cold sprayed metallic layer applied to an aerospace vehicle. An application of the presently disclosed method is shown on an aerospace vehicle 400, whereby vehicle polymer substrate surface 402 comprised of a fiber-reinforced plastic (FRP) is subjected to the presently disclosed method. Exploded view 4A is shown having vehicle polymer substrate surface 402 with thermoplastic polymer layer 404 and cold sprayed metal layer 406 so as to provide electrical conductivity or barrier layer properties, impart EMI shielding, corrosion resistance, erosion resistance, or other properties to the surface of the multilayered composite material, and/or into a structural component of or a portion of a vehicle, wind turbine, and the like. In one example the application of the presently disclosed method is directed to an external surface of the aerospace vehicle 400.

Figure 5:
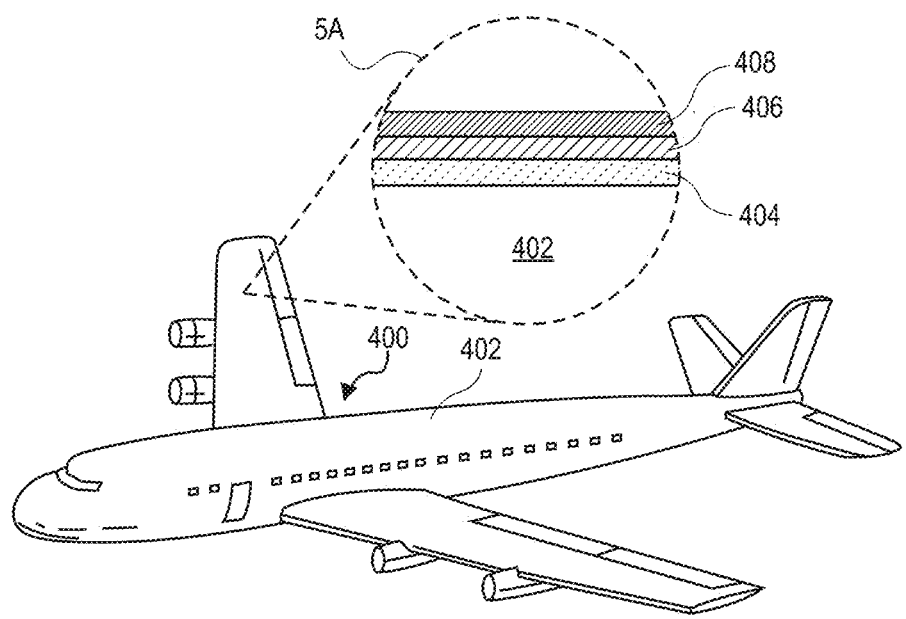
FIG. 5 depicts an application of a multilayered article including a cold sprayed metallic layer applied to an aerospace vehicle.

FIG. 5 depicts an application of a multilayered article including a cold sprayed metallic layer applied to an acrospace vehicle. An additional application of the presently disclosed method is shown on an aerospace vehicle 400, whereby vehicle polymer substrate surface 402 comprised of FRP is subjected to the presently disclosed method. Exploded view 5A is shown having vehicle polymer substrate surface 402 with thermoplastic polymer layer 404 and cold sprayed metal layer 406 and an additional coating layer 408 so as to impart electrical conductivity, EMI shielding, corrosion resistance, or other properties to the surface of the multilayered composite material, and/or into a structural component of or a portion of a vehicle.

Figure 6:
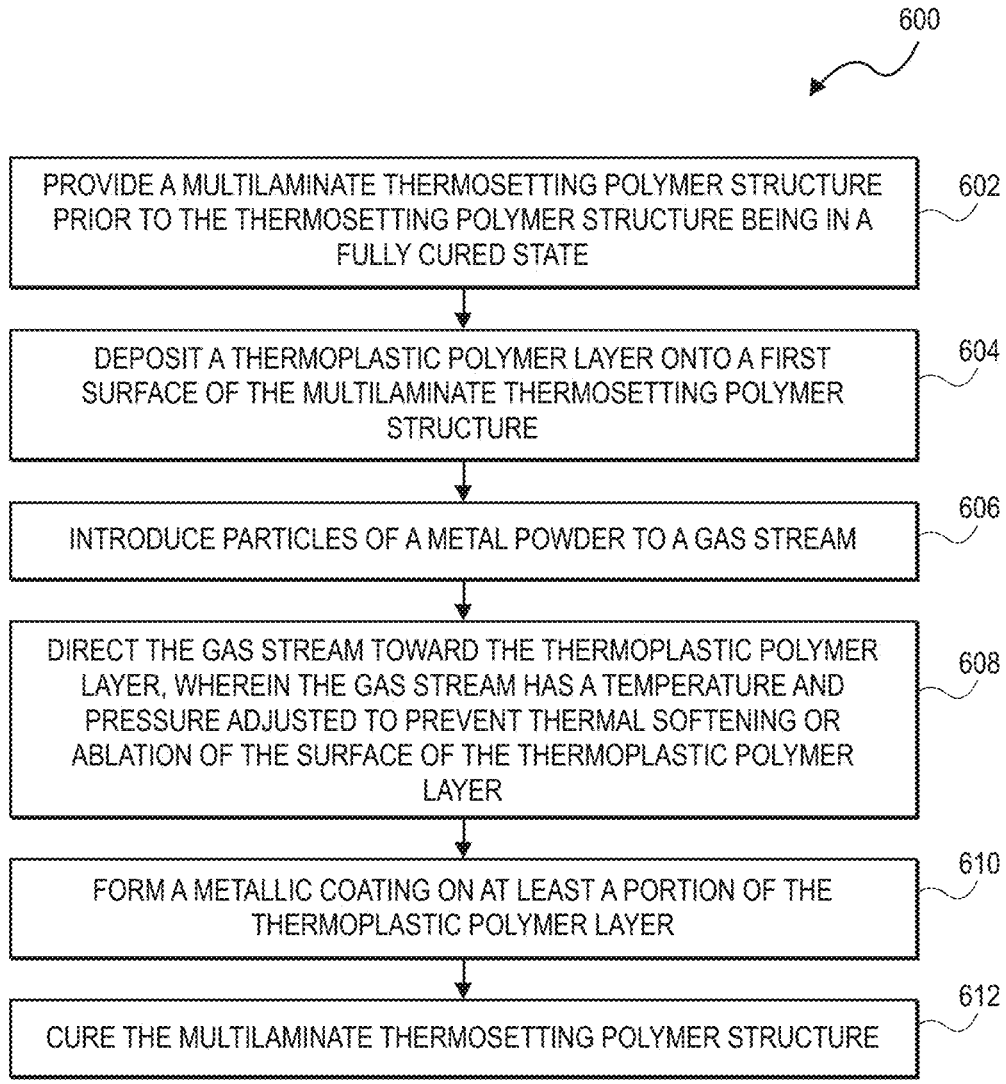
FIG. 6 is a flowchart illustrating a method of providing a multilayered article, in accordance with the present disclosure.

FIG. 6 is a flowchart illustrating a method of providing a multilayered article, in accordance with the present disclosure. The method of providing a composite laminate structure 600 begins with an initial step to provide a multilaminate thermosetting polymer structure prior to the thermosetting polymer structure being in a fully cured state 602 followed by a step to deposit a thermoplastic polymer layer onto a first surface of the multilaminate thermosetting polymer structure 604. The thermoplastic polymer layer in some aspects may include a poly-ether-ether-ketone (PEEK), poly-ether-ketone-ketone (PEKK), or a combination thereof. In other examples, the thermoplastic polymer layer may include other polymers or additives as referenced herein. In certain aspects, the thermoplastic polymer layer may have a crystallinity of about 15% to about 40%. A subsequent step in the method of providing a composite laminate structure 600 is to introduce particles of a metal powder to a gas stream 606, followed by directing the gas stream toward the thermoplastic polymer layer, wherein the gas stream has a temperature and pressure adjusted to prevent thermal softening or ablation of the surface of the thermoplastic polymer layer 608. In examples, the temperature of the gas stream is between 100° C. and 500° C. and the pressure of the gas stream is between 100 psi and 400 psi. Next, a metallic coating is formed on at least a portion of the thermoplastic polymer layer 610. In certain examples, the metal coating is selected from silver, gold, aluminum, cobalt, chromium, copper, iron, nickel, molybdenum, palladium, platinum, rhodium, ruthenium, tin, titanium, tungsten, zinc, zirconium, or alloys thereof. A final step in the method of providing a composite laminate structure 600 is to cure the multilaminate thermosetting polymer structure 612. Certain examples of the method of providing a composite laminate structure 600 include curing the multilaminate thermosetting polymer structure by subjecting the composite laminate structure to an elevated temperature under pressure. In other aspects, the method of providing a composite laminate structure 600 may include depositing a second thermoplastic polymer layer onto a second surface of the multilaminate thermosetting polymer structure, directing the gas stream toward the second thermoplastic polymer layer, and forming a metallic coating on at least a portion of the second thermoplastic polymer layer.

EXAMPLES

Figure 7A:
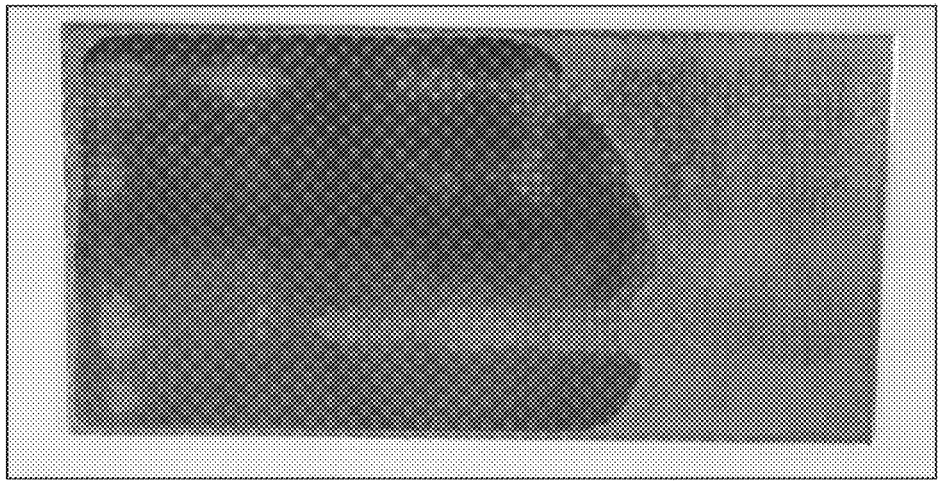
FIGS. 7A and 7B depict photographic experimental results of the cold spray metal deposition of a layer obtained using the presently disclosed process.
Figure 7B:
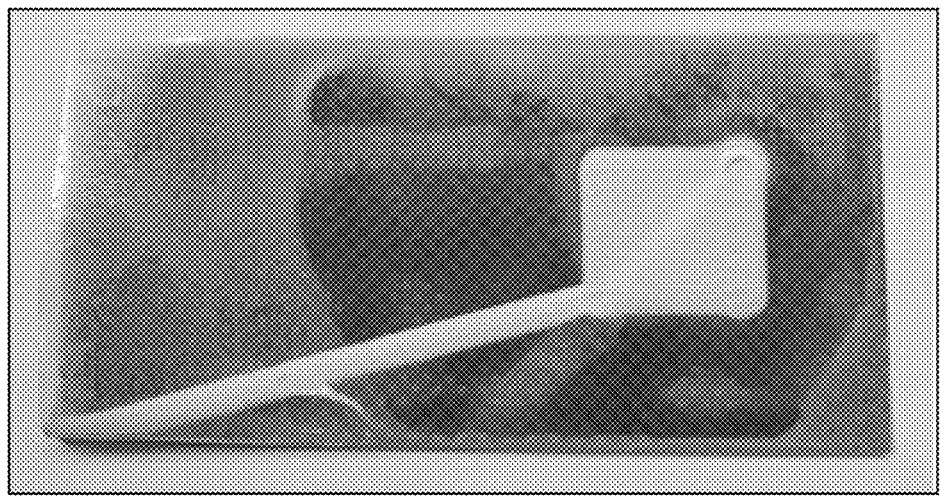

FIGS. 7A and 7B depict photographic experimental results of the cold spray metal deposition of a layer obtained using the presently disclosed process, showing an effective patterning of a cold sprayed metal layer adhered to a thermoplastic layer. The procedure to produce the examples shown in FIGS. 4A and 4B employed aluminum metallic particles having an average particle size of 40 microns. Spraying conditions utilized a CenterLine (Windsor) Limited system cold spray coating apparatus, with robotics spray pressure 100-400 psi, gas heating temperature 100° C.-500° ° C., using either air or nitrogen gas.

An already cured carbon fiber reinforced plastic (CFRP), such as any suitable aerospace grade thermosetting composite, coupon had an adhered 4 mil DS PEKK film to a top surface in a heated press at 350° F. at a pressure of approximately 2000 lb, with a coupon area of 18 in². While at pressure, the heaters were turned off and the press was allowed to cool to room temperature overnight, approximately 16 hours, as shown in FIG. 7A. Aluminum was cold sprayed on the thermoplastic layer, under the conditions described above, resulting in the film depicted in FIG. 7B. Typical aerospace thermosetting composites using woven fabrics may be used in exemplary examples.

The preceding description of various aspect(s) is merely exemplary in nature and is in no way intended to limit the disclosure, its application, or uses.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

As used throughout this disclosure, ranges are used as shorthand for describing each and every value that is within the range. It should be appreciated and understood that the description in a range format is merely for convenience and brevity, and should not be construed as an inflexible limitation on the scope of any examples or implementations disclosed herein. Accordingly, the disclosed range should be construed to have specifically disclosed all the possible subranges as well as individual numerical values within that range. As such, any value within the range can be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight of total solids. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that can be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

The present disclosure has been described with reference to exemplary implementations. Although a limited number of implementations have been shown and described, it will be appreciated by those skilled in the art that changes can be made in these implementations without departing from the principles and spirit of the preceding detailed description. It is intended that the present disclosure be construed as including all such modifications and alterations insofar as they come within the scope of the appended claims or the equivalents thereof.

We claim:

1. A multilayered article, comprising:
 a thermosetting polymer material having at least one surface;
 a thermoplastic polymer layer deposited on a first surface of the at least one surface of the thermosetting polymer material;
 a cold sprayed metal layer present on at least a portion of a surface of the thermoplastic polymer layer;
 at least one additional layer, the at least one additional layer sandwiching at least a portion of the cold sprayed metal layer between the additional layer and the thermoplastic polymer layer; and wherein:
 the thermoplastic polymer layer has a crystallinity of about 5% to 25%; and
 the thermoplastic polymer layer adheres to the surface of the thermosetting polymer material due to curing of the thermosetting polymer material after deposition of the thermoplastic polymer layer.

2. The multilayered article of claim 1, wherein the thermosetting polymer material comprises an epoxy resin.

3. The multilayered article of claim 1, wherein the thermosetting polymer material comprises multiple layers.

4. The multilayered article of claim 1, wherein the thermosetting polymer material further comprises one or more fillers or reinforcement materials comprising carbon, carbon nanotubes, graphite, carbon fibers, graphite fibers, fiberglass, glass fibers, metals, metal alloys, metalized fibers or metal coated glass fibers.

5. The multilayered article of claim 1, wherein the thermoplastic polymer layer comprises a carbon fiber or glass fiber reinforced poly-ether-ether-ketone (PEEK) or poly-ether-ketone-ketone (PEKK).

6. The multilayered article of claim 1, wherein the cold sprayed metal layer is selected from silver, gold, aluminum, cobalt, chromium, copper, iron, nickel, molybdenum, palladium, platinum, rhodium, ruthenium, tin, titanium, tungsten, zinc, zirconium, or alloys thereof.

7. The multilayered article of claim 1, wherein the multilayered article is a component or part of an aerospace vehicle.

8. The multilayered article of claim 7, wherein the component or part of an aerospace vehicle is an external surface thereof.

9. The multilayered article of claim 1, further comprising:
 a second thermoplastic polymer layer having a first surface and a second surface wherein the first surface is deposited on a second surface of the at least one surface of the thermosetting polymer material;
 a second cold sprayed metal layer present on at least a portion of the second surface of the second thermoplastic polymer layer; and
 wherein the second thermoplastic polymer layer has a crystallinity of about 5% to about 60%.

10. The multilayered article of claim 9, wherein the second thermoplastic polymer layer comprises a carbon fiber or glass fiber reinforced poly-ether-ether-ketone (PEEK) or poly-ether-ketone-ketone (PEKK).

11. The multilayered article of claim 9, wherein the second cold sprayed metal layer is selected from silver, gold, aluminum, cobalt, chromium, copper, iron, nickel, molybdenum, palladium, platinum, rhodium, ruthenium, tin, titanium, tungsten, zinc, zirconium, or alloys thereof.

12. The multilayered article of claim 1, wherein the thermoplastic polymer layer further comprises fiberglass.

13. The multilayered article of claim 1, wherein the thermoplastic polymer layer further comprises a metal-metal oxide composite material.

14. The multilayered article of claim 1, wherein the at least one additional layer comprises a metal different than the cold sprayed metal layer.

15. A multilayered article, comprising:
a thermosetting polymer material having a first surface and a second surface;
a first thermoplastic polymer layer deposited on the first surface of the thermosetting polymer material;
a second thermoplastic polymer layer deposited on the second surface of the thermosetting polymer material;
a first cold sprayed metal layer present on at least a portion of a surface of the first thermoplastic polymer layer;
a second cold sprayed metal layer present on at least a portion of a surface of the second thermoplastic polymer layer;
a first additional layer sandwiching at least a portion of the first cold sprayed metal layer between the first additional layer and the first thermoplastic polymer layer;
a second additional layer sandwiching at least a portion of the second cold sprayed metal layer between the second additional layer and the second thermoplastic polymer layer; and wherein
the first thermoplastic polymer layer and the second thermoplastic polymer layer each have a crystallinity of about 5% to 25%; and
the thermoplastic polymer layer adheres to the surface of the thermosetting polymer material due to curing of the thermosetting polymer material after deposition of the thermoplastic polymer layer.

16. A method of providing a multilayered article, the method comprising:
providing a multilaminate thermosetting polymer structure prior to the multilaminate thermosetting polymer structure being in a fully cured state;
depositing a thermoplastic polymer layer having a crystallinity of about 5% to 25% onto a first surface of the multilaminate thermosetting polymer structure;
forming a cold sprayed metal layer by introducing particles of a metal powder to a gas stream;
directing the gas stream toward the thermoplastic polymer layer, wherein the gas stream has a temperature and pressure adjusted to prevent thermal softening or ablation of the surface of the thermoplastic polymer layer;
forming the cold sprayed metal layer on at least a portion of the thermoplastic polymer layer;
applying an additional layer, the additional layer sandwiching at least a portion of the cold sprayed metal layer between the additional layer and the thermoplastic polymer layer; and
curing the multilaminate thermosetting polymer structure along with the thermoplastic polymer layer after depositing the thermoplastic polymer layer.

17. The method of providing the multilayered article of claim 16, wherein the thermoplastic polymer layer comprises poly-ether-ether-ketone (PEEK), poly-ether-ketone-ketone (PEKK), or a combination thereof.

18. The method of providing the multilayered article of claim 16,
wherein the thermoplastic polymer layer has a crystallinity of about 15% to 25%.

19. The method of providing the multilayered article of claim 16, wherein the cold sprayed metal layer is selected from silver, gold, aluminum, cobalt, chromium, copper, iron, nickel, molybdenum, palladium, platinum, rhodium, ruthenium, tin, titanium, tungsten, zinc, zirconium, or alloys thereof.

20. The method of providing the multilayered article of claim 16, wherein the temperature of the gas stream is between 100° C. and 500° C. and the pressure of the gas stream is between 100 psi and 400 psi.

21. The method of providing the multilayered article of claim 16, wherein curing the multilaminate thermosetting polymer structure comprises subjecting the multilayered article to an elevated temperature under pressure.

22. The method of providing the multilayered article of claim 16, further comprising:
depositing a second thermoplastic polymer layer onto a second surface of the multilaminate thermosetting polymer structure;
directing the gas stream toward the second thermoplastic polymer layer; and
forming a second cold sprayed metal layer on at least a portion of the second thermoplastic polymer layer.

* * * * *